(12) United States Patent
Ha et al.

(10) Patent No.: US 11,336,093 B2
(45) Date of Patent: May 17, 2022

(54) METHOD FOR DETERMINING A SEQUENCE OF OPERATION OF A SET OF GENERATOR UNITS OF AN ELECTRICAL NETWORK

(71) Applicant: COMMISSARIAT À L'ENERGIE ATOMIQUE ET AUX ENERGIES ALTERNATIVES, Paris (FR)

(72) Inventors: Duy Long Ha, Grenoble (FR); Grégoire Pichenot, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/127,071

(22) Filed: Dec. 18, 2020

(65) Prior Publication Data
US 2021/0194243 A1    Jun. 24, 2021

(30) Foreign Application Priority Data

Dec. 20, 2019  (FR) ...................................... 1915107

(51) Int. Cl.
*H02J 3/00* (2006.01)
*G06Q 10/04* (2012.01)
(Continued)

(52) U.S. Cl.
CPC .............. *H02J 3/003* (2020.01); *G06Q 10/04* (2013.01); *G06Q 50/06* (2013.01); *H02J 3/46* (2013.01)

(58) Field of Classification Search
None
See application file for complete search history.

(56) References Cited

U.S. PATENT DOCUMENTS

| 2,495,792 A * | 1/1950 | Warnick ..................... H02J 3/14 |
| | | 307/112 |
| 2011/0175450 A1* | 7/2011 | Vicari ..................... G05B 15/02 |
| | | 307/62 |

(Continued)

FOREIGN PATENT DOCUMENTS

| JP | S62-131725 A | 6/1987 |
| JP | 2009-189226 A | 8/2009 |

(Continued)

OTHER PUBLICATIONS

Qiu et al., "An Integrated Approach for Power System Restoration Planning," IEEE, 2017, 19pg. (Year: 2017).*

(Continued)

*Primary Examiner* — Ryan D. Coyer
(74) *Attorney, Agent, or Firm* — Pillsbury Winthrop Shaw Pittman LLP

(57) ABSTRACT

A method for determining a sequence of operation of at least one set of generator units of an electrical network includes assigning a rank to each generator unit; from a projected load curve, determining a minimum number of generator units; for each generator unit having a rank less than or equal to the minimum number of generator units, allocating in the sequence of operation the on state to the generator unit for each time interval; for each generator unit having a rank greater than the minimum number of generator units, allocating, by increasing rank, for each time interval of the sequence of operation the on state or the off state to the generator unit, and for each generator unit to which is assigned the on state at a given time interval of the sequence of operation, allocating an operating power, by optimisation of a cost function over a period.

12 Claims, 3 Drawing Sheets

(51) Int. Cl.
*G06Q 50/06* (2012.01)
*H02J 3/46* (2006.01)

(56) References Cited

U.S. PATENT DOCUMENTS

2012/0091974 A1* 4/2012 Chu .......................... H02P 9/48
322/94
2017/0039659 A1* 2/2017 Liu .................. G06Q 10/06315

FOREIGN PATENT DOCUMENTS

JP       2010-035321 A    2/2010
WO    WO 2016/102675 A1   6/2016

OTHER PUBLICATIONS

Sun et al., "Optimal Generator Start-Up Strategy for Bulk Power System Restoration," IEEE, 2010, 10pg. (Year: 2010).*

Search Report as issued in French Patent Application No. 1915107, dated Jun. 30, 2020.

Frisk, M., "On-ship Power Management and Voyage Planning Interaction," Uppsala Universitet, Jun. 2015, 51 pages.

Morales-España, G., et al., "Tight and Compact MILP Formulation of Start-Up and Shut-Down Ramping in Unit Commitment," IEEE Transactions on Power Systems, vol. 28, No. 2, May 2013, pp. 1288-1296.

Hechme-Doukopoulos, G., et al., "The short-term electricity production management problem at EDF," Optima Newsletter, Mathematical Optimization Society, (2010), 84, pp. 2-6, hal-00804159, 6 pages.

Hashmi, M. U., et al., "Long-Term Revenue Estimation for Battery Performing Arbitrage and Ancillary Services," 2018 IEEE International Conference on Communications, Control, and Computing Technologies, for Smart Grids (SmartGridComm), (2018), 7 pages.

* cited by examiner

METHOD FOR DETERMINING A SEQUENCE OF OPERATION OF A SET OF GENERATOR UNITS OF AN ELECTRICAL NETWORK

CROSS-REFERENCE TO RELATED APPLICATIONS

This application claims priority to French Patent Application No. 1915107, filed Dec. 20, 2019, the entire content of which is incorporated herein by reference in its entirety.

FIELD

The technical field of the invention is that of electrical networks and more specifically that of the management of the operation of generator units of an electrical network.

The present invention relates to a method for determining a sequence of operation of at least one set of generator units of an electrical network. The present invention also relates to a method for implementing the sequence of operation by the electrical network.

BACKGROUND

In order to adapt the supply of energy by an electrical network to the energy demand on the electrical network and to be capable of supplying the necessary energy while avoiding or limiting imbalances, energy suppliers plan in advance the on/off state in which each generator unit of the electrical network must be found at each time interval of a given period, as well as the power assigned to an on generator unit at a given time interval.

In order that this planning is optimal, notably in terms of wear of the pool of generator units, greenhouse gas emissions and fuel consumption, it is necessary to determine the state variables and powers of the generator units at each time interval, both by minimising the number of start-ups of the generator units and by maximising the efficiency of each on generator unit.

To do so, it is known to use an optimisation method by mixed linear programming or by dynamic programming. However, these optimisation methods only work for electrical micro-networks having only several generator units. For example, the dynamic programming approach cannot provide this planning for an electrical network having more than 4 generator units with a 2.3 GHz processor and 8G of RAM.

There thus exists a need to obtain an optimum planning, notably in terms of fuel consumption, wear of the pool of generator units and greenhouse gas emissions, of the operation of the generator units of an electrical network being able to comprise more than four generator units.

SUMMARY

An aspect of the invention offers a solution to the aforementioned problems, by making it possible to determine, at each time interval of a given period, the state and the operating power of each generator unit of an electrical network comprising more than several generator units, notably to optimise the fuel consumption of the generator units, the wear of the generator units and the emission of greenhouse gases.

A first aspect of the invention relates to a method, implemented by computer, for determining a sequence of operation of at least one set of generator units of an electrical network, the generator units of the set being identical, the sequence of operation allocating for each time interval of a given period, an off state or an on state to each generator unit and allocating an operating power comprised between a minimum power of the generator unit and a maximum power of the generator unit to each generator unit to which is allocated the on state for the time interval, the method comprising the following steps:

Assigning a rank to each generator unit;
From a projected load curve, determining a minimum number of generator units destined to be allocated the on state over the given period;
For each generator unit having a rank less than or equal to the minimum number of generator units, allocating in the sequence of operation the on state to the generator unit for each time interval;
For each generator unit having a rank greater than the minimum number of generator units $N_{min}$, allocating, by increasing rank, for each time interval of the sequence of operation the on state or the off state to the generator unit, and for each generator unit to which is assigned the on state at a given time interval of the sequence of operation, allocating an operating power, by optimisation of a cost function over the period with a constraint according to which the number of time intervals over the whole of the period for which the on state is allocated to the generator is greater than or equal to the number of time intervals over the whole of the period for which the on state is allocated to each generator unit having a rank greater than the generator.

Thanks to the invention, the complexity of the problem for the states of the generator units, equal to $2^{t \times n}$ with t the number of time intervals in the given period and n the number of generator units of the electrical network, is considerably decreased. Indeed, on the one hand the assignment of a rank to each generator unit and the constraint make it possible to break the symmetry of the problem by decreasing the number of possibilities for each generator unit as the rank increases and, on the other hand, the calculation of a minimum number of generator units makes it possible to decrease the number of calculations for a certain number of generator units on over the entire period. The calculation of the states and the powers of the generator units from the cost function makes it possible to ensure the optimality of the solution. This decrease makes it possible to obtain a sequence of operation for electrical networks having fifteen or so generator units for a time interval of 1 minute over a period of 24 h, for electrical networks having more than one hundred or so generator units for a time interval of 10 minutes over a period of 24 h and for electrical networks having more than 300 generator units for a time interval of 30 minutes over a period of 24 h.

Apart from the characteristics that have been mentioned in the preceding paragraph, the method according to a first aspect of the invention may have one or more complementary characteristics among the following, considered individually or according to all technically possible combinations thereof.

According to an alternative embodiment, the rank of a generator unit depends on its number of operating hours and/or on its availability.

Thus, it is possible to assign the rank to homogenise the wear of the pool of generator units or to take into account the unavailability, for example for maintenance, of a generator unit._

According to a first embodiment compatible with the preceding alternative embodiment, the minimum number $N_{min}$ of generator units is equal to:

$$N_{min} = \left\lfloor \frac{\alpha \cdot P_{min}^c + \beta \cdot P_{av}^c}{P_{ref}^g} \right\rfloor$$

With: $P_{min}^c$ the minimum power of the projected load curve, $P_{av}^c$ the average power of the projected load curve, $P_{ref}^g$ a reference power of the generator unit, $\alpha$ and $\beta$ coefficients comprised between 0 and 1 such that the sum of $\alpha$ and $\beta$ is equal to 1 and $\lfloor \cdot \rfloor$ the integer part.

Thus, it is possible of calculate the minimum number of generator units for projected load curves having varied profiles.

According to a second embodiment compatible with the preceding alternative embodiment, the minimum number $N_{min}$ of generator units is equal to:

$$N_{min} = \left\lfloor \frac{P_{min}^c}{P_{ref}^g} + 1 \right\rfloor$$

With: $P_{min}^c$ the minimum power of the projected load curve, $P_{ref}^g$ a reference power of the generator unit and $\lfloor \cdot \rfloor$ the integer part.

Thus, it is possible of calculate the minimum number of generator units for projected load curves having a relatively flat profile, with fewer calculations compared to the first embodiment, since it is not necessary to estimate $\alpha$ and $\beta$.

According to an alternative embodiment compatible with the preceding embodiments, the reference power $P_{ref}^g$ of the generator unit is equal to the maximum power $P_{max}^g$ of the generator unit or to an optimum power $P_{opt}^g$ of the generator unit.

According to an alternative embodiment compatible with the preceding embodiments and alternative embodiments, the cost function comprises the sum, for each generator unit, of a start-up cost of the generator units and an operating cost of the generator units over the period.

Thus, the cost function makes it possible to minimise the wear, the fuel consumption and the greenhouse gas emissions of the generator units.

According to an alternative sub-embodiment of the preceding alternative embodiments, the operating cost of a generator unit depends on an efficiency curve of the generator unit giving the efficiency of the generator unit as a function of its operating power, the optimum power $P_{opt}^g$ of the generator unit corresponding to the maximum of the efficiency curve.

Thus, the cost function takes into account the efficiency of the on generator units to minimise greenhouse gas emissions and fuel consumption.

According to an alternative embodiment compatible with the preceding embodiments and alternative embodiments, the electrical network comprises several sets of identical generator units, the method comprising a prior step of scheduling the sets of generator units by decreasing maximum power of the generator units of the set, the steps of the method being carried out for each set by increasing order, the projected load curve for the set taking into account the energy consumption on the electrical network and the energy supplied by each set having an order less than the set.

Thus, it is possible to further decrease the complexity of the problem by scheduling the sets of generator units.

According to an alternative sub-embodiment of the preceding alternative embodiment, the projected load curve further takes into account the energy produced by energy sources other than the generator units in the electrical network.

Thus, the projected load curve may take into account other energy sources of the network.

According to an alternative embodiment of the preceding alternative sub-embodiment, the other energy sources are at least one photovoltaic device and/or at least one wind powered device and/or at least one battery.

A second aspect of the invention relates to a method for implementing, on the electrical network, the sequence of operation determined by the method according to the first aspect of the invention during the period, comprising the following steps:

At each time interval:
    Starting up each off generator unit to which is allocated the on state in the sequence of operation at the time interval;
    Shutting down each on generator unit to which is allocated the off state in the sequence of operation at the time interval if the generator unit is on;
    Placing at the corresponding operating power each generator unit to which is allocated the on state in the sequence of operation at the time interval.

A third aspect of the invention relates to a computer programme product comprising instructions which, when the programme is executed by a computer, lead it to implement the steps of the method according to the first aspect of the invention.

A fourth aspect of the invention relates to a computer readable recording support comprising instructions which, when they are executed by a computer, lead it to implement the steps of the method according to the first aspect of the invention.

The invention and the different applications thereof will be better understood on reading the description that follows and by examining the figures that accompany it.

BRIEF DESCRIPTION OF THE FIGURES

The figures are described for indicative purposes and in no way limit the invention.

DETAILED DESCRIPTION

Unless stated otherwise, a same element appearing in the different figures has a single reference.

A first aspect of the invention relates to a method for determining a sequence of operation of at least one set of generator units of an electrical network. The generator units are identical within a set.

"'Electrical network" is taken to mean a set of infrastructures making it possible to convey electrical energy produced by energy sources to electrical energy consumers.

In the remainder of the description, the terms "electrical network" and "network" will be used indiscriminately.

The sequence of operation is determined in such a way as to supply the energy consumers of the network the electrical energy consumed while producing it in the most efficient possible manner.

Figure 2:
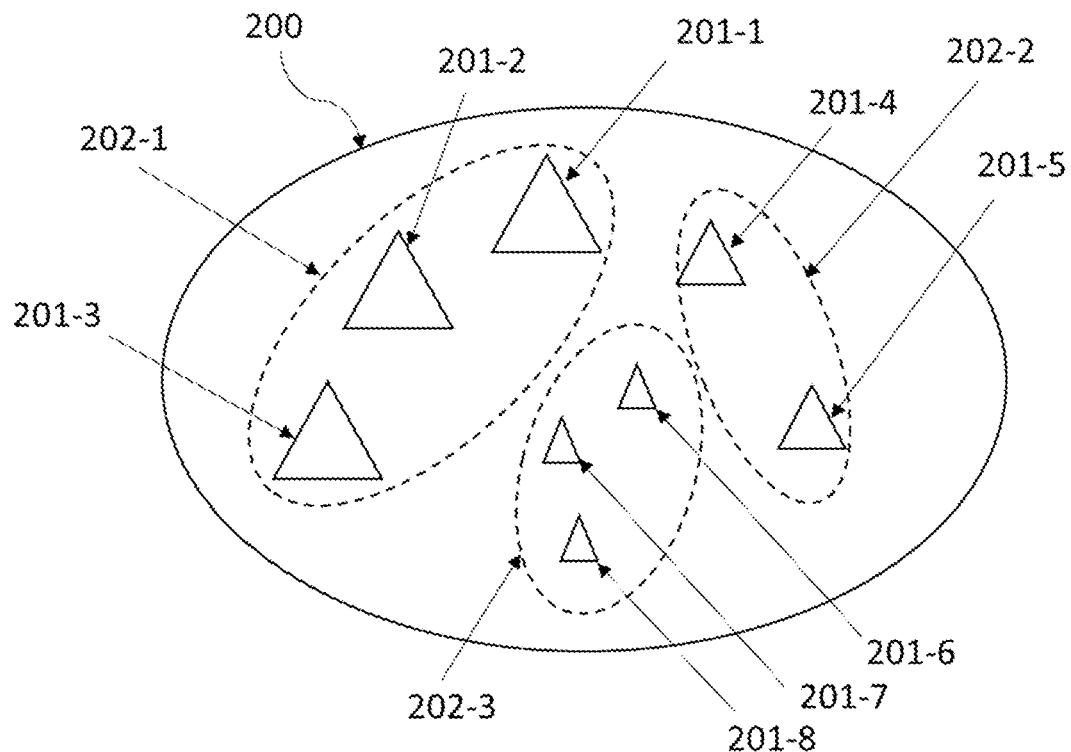
FIG. 2 shows a schematic representation of an electrical network.

FIG. 2 shows a schematic representation of an electrical network 200.

The electrical network 200 comprises a plurality of generator units 201.

"Generator unit" is taken to mean an autonomous device capable of producing electrical energy from thermal energy supplied by a heat engine fed with fuel. A generator unit 201 thus emits greenhouse gases, and in particular $CO_2$, to produce electrical energy, and consumes fuel. A generator unit also requires maintenance, the occurrence of which is for example influenced by the number of start-ups and hours of operation thereof.

An objective of an aspect of the invention is to supply the consumers of the electrical network 200 with energy, while minimising fuel consumption, greenhouse gas emissions and the need for maintenance of the generator units 201.

A generator unit 201 in the electrical network 200 may be in two states, either in an off state in which the generator unit 201 does not supply electrical energy to the network 200, or in an on state in which the generator unit 201 supplies electrical energy to the network 200 at a given power, called operating power $P_f$.

Each start-up of a generator unit 201 increases its wear and thus its need for maintenance. Thus, to minimise the wear of a generator unit, it is necessary to minimise the number of start-ups of the generator unit 201.

Figure 4:
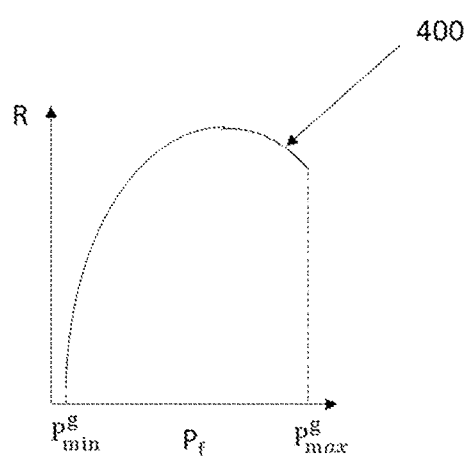
FIG. 4 shows an efficiency curve of a generator unit representing the efficiency of the generator unit as a function of its operating power.

FIG. 4 shows an efficiency curve 400 of a generator unit 201, that is to say the efficiency of the generator unit 201 as a function of its operating power $P_f$.

The efficiency of a generator unit 201 is defined as the ratio between the electrical energy produced by the generator unit 201 and the thermal energy supplied to the generator unit 201.

The operating power $P_f$ is comprised between a minimum power $P_{min}^c$ of the generator unit 201 and a maximum power $P_{max}^g$ of the generator unit 201.

In FIG. 4, it is observed that the efficiency of the generator unit 201 increases until reaching a maximum at an optimum power $P_{opt}^g$ of the generator unit 201, corresponding to around 85% of the maximum power $P_{max}^g$ of the generator unit 201, then decreases.

Thus, to minimise the thermal energy to supply to the generator unit 201 and thus its fuel consumption and its greenhouse gas emissions, it is desirable to maximise the efficiency of the generator unit 201 by choosing an operating power $P_f$ close to the optimum power $P_{opt}^g$ of the generator unit 201.

Within a network 200, the generator units 201 may be identical, which leads to having a same efficiency curve 400, that is to say the same or different minimum $P_{min}^c$, maximum $P_{max}^g$ and optimum $P_{opt}^g$ powers as represented in FIG. 2. The identical generator units 201 are gathered together within a set 202 of generator units 201.

In FIG. 2, the electrical network 200 comprises three sets 202. A first set 202-1 comprises three generator units 201-1, 201-2, 201-3, a second set 202-2 comprises two generator units 201-4, 201-5 and a third set 202-3 comprises three generator units 201-6, 201-7, 201-8.

In FIG. 2, the larger the symbol representing a generator unit 201, the more the corresponding generator unit 201 operates with high power. Thus, the generator units 201 of the first set 202-1 operate with higher powers than the generator units 201 of the second set 202-2 and the generator units 201 of the second set 202-2 operate with higher powers than the generator units 201 of the third set 202-3.

The electrical network 200 may comprise other electrical energy sources than the generator units 201, for example at least one photovoltaic device configured to supply electrical energy to the network 200 from energy supplied by the sun and/or at least one wind powered device configured to supply electrical energy to the network 200 from energy supplied by wind and/or at least one battery configured to supply stored electrical energy to the network 200. The electrical energy stored in the battery has for example been stored when the electrical energy supplied by the network 200 exceeded the electrical energy consumed.

"Determining a sequence of operation of the generator units of an electrical network" is taken to mean determining, for each time interval of a given period, the on or off state of each generator unit 201 of the network 200 over the given time interval and the operating power $P_f$ in the case where a generator unit 201 is assigned to the on state for the given time interval.

The sequence of operation is determined via the method according to the first aspect of the invention to minimise wear of the generator units 201 and thus their need for maintenance, greenhouse gas emissions and fuel consumption, that is to say to minimise the number of start-ups of the generator units 201 and to maximise the efficiency of each on generator unit 201.

Figure 1:
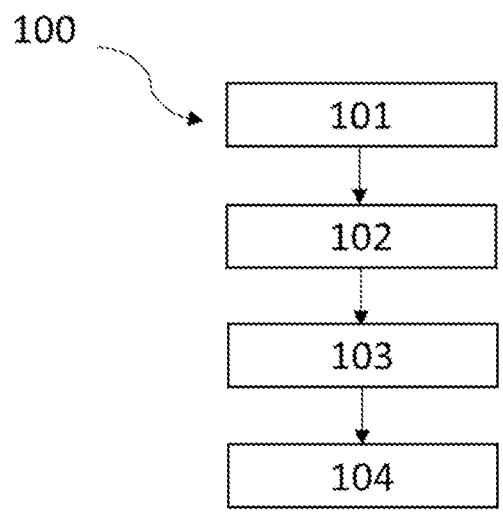
FIG. 1 is a synoptic diagram representing the steps of the method according to the first aspect of the invention.

FIG. 1 is a synoptic diagram representing steps 101 to 104 of the method 100 according to the first aspect of the invention.

A first step 101 of the method 100 consists in assigning a rank to each generator unit 201 of a set 202, that is to say scheduling the generator units 201 of the set 202 with respect to each other.

In the remainder of the method 100, the lower the rank of a generator unit 201, the greater the chance of it being in an on state over the period of the sequence of operation.

The assignment of a rank to a given generator unit 201 may be random or depend on at least one parameter, for example the number of operating hours of the generator unit 201 and/or its availability. Thus, if a generator unit 201 is in maintenance or if its level of wear is much greater than that of the other generator units 201 of the network 200, a higher rank will be assigned to it so that it has less chance of being allocated the on state.

A second step 102 of the method 100 consists in determining a minimum number $N_{min}$ of generator units 201 of the set 202 destined to be in the on state over the entire given period, that is to say to be on during the first time interval of the given period and not to be shut down during the remainder of the given period.

The minimum number $N_{min}$ of generator units 201 is determined from a load curve.

"Load curve" is taken to mean the curve representing the electrical power that the network 200 must supply to the consumers of the network 200 over the given period.

In the case where the generator units constitute the only energy source of the electrical network 200, the load curve corresponds to the electrical power consumed.

In the case where the network 200 comprises other energy sources, the load curve corresponds to the difference between the electrical power consumed and the power supplied by the other energy sources.

The given period being to come in the context of the invention, the load curve is qualified as projected. The projected load curve is for example estimated on the basis of the load curve of a period preceding the given period.

Figure 3:
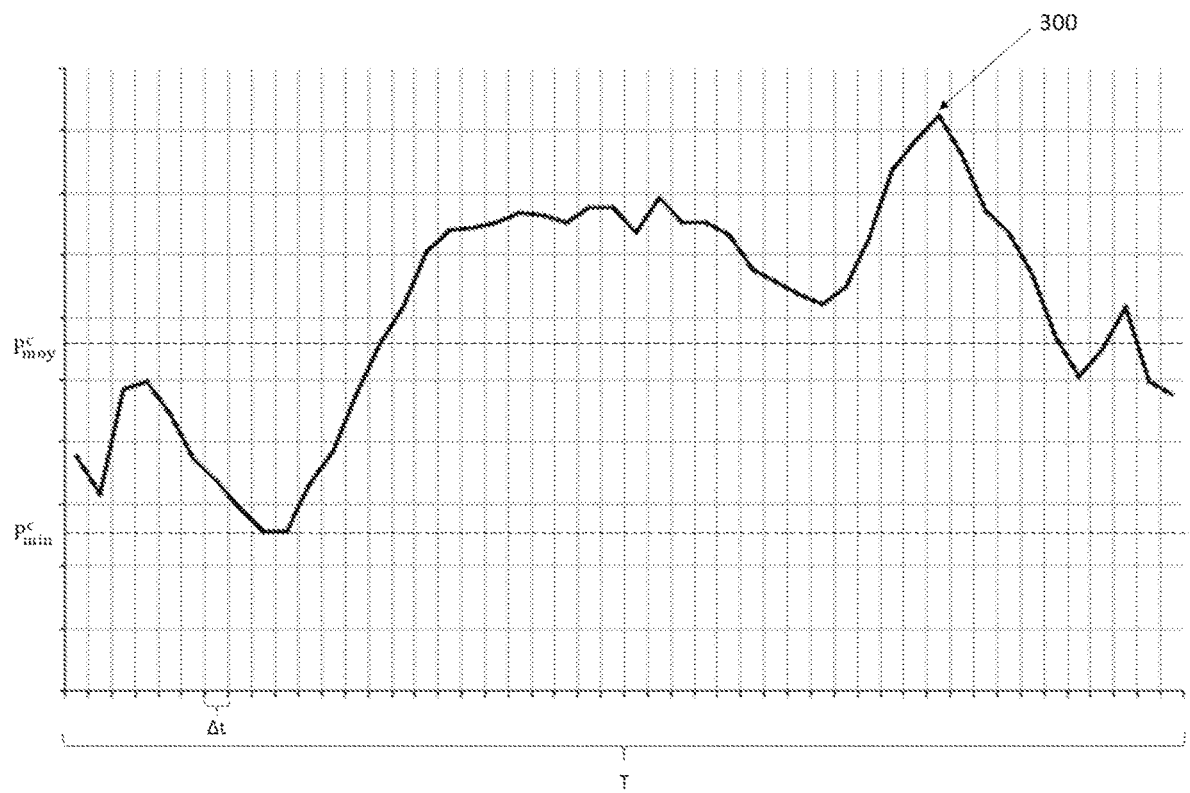
FIG. 3 shows a projected load curve representing the power to supply as a function of time over a given period.

FIG. 3 shows a projected load curve 300 over a period T divided into identical time intervals Δt.

The period T is for example 24 hours or 48 hours and the time interval Δt is for example one minute, 10 minutes or 30 minutes.

In methods of the prior art, in the case where the period T is 24 hours and the time interval Δt 10 minutes, the number of time intervals Δt is equal to 144 and the sequence of operation comprises $2^{144 \times n}$ possible states of generator units 201, with n the number of generator units 201 of the network 200. Thus, in the case of a network 200 comprising 14 generator units, the sequence of operation comprises $2^{2016}$ possible states of generator units 201.

The projected load curve 300 comprises a minimum power $P_{min}^c$ and an average power $P_{av}^c$ over the period T.

Before the first time interval Δt of the period T, the generator units 201 are off.

The minimum number $N_{min}$ of generator units 201 is typically chosen such that:

$$\left\lfloor \frac{P_{min}^c}{P_{max}^g} \right\rfloor + 1 \leq N_{min} \leq \left\lfloor \frac{P_{max}^c}{P_{min}^g} \right\rfloor$$

With:
$P_{min}^c$ the minimum power of the projected load curve 300;
$P_{max}^c$ the maximum power of the projected load curve 300;
$P_{min}^g$ the minimum power of the generator unit 201;
$P_{max}^g$ the maximum power of the generator unit 201;
$\lfloor \cdot \rfloor$ the integer part.

According to a first embodiment, the minimum number $N_{min}$ of generator units 201 that it is necessary to start up is equal to:

$$N_{min} = \left\lfloor \frac{\alpha . P_{min}^c + \beta . P_{av}^c}{P_{ref}^g} \right\rfloor$$

With:
$P_{min}^c$ the minimum power of the projected load curve 300;
$P_{av}^c$ the average power of the projected load curve 300;
$P_{ref}^c$ a reference power of the generator unit 201;
α and β coefficients comprised between 0 and 1, preferentially such that the sum of α and β is equal to 1;
$\lfloor \cdot \rfloor$ the integer part.

α is for example comprised in the interval [0.7, 0.9] and β in the interval [0.1, 0.3]. α is equal for example to 0.9 and β is equal for example to 0.1.

According to a second embodiment, the minimum number $N_{min}$ of generator units 201 that it is necessary to start up is equal to:

$$N_{min} = \left\lfloor \frac{P_{min}^c}{P_{ref}^g} + 1 \right\rfloor$$

With:
$P_{min}^c$ the minimum power of the projected load curve 300;
$P_{ref}^g$ the reference power of the generator unit 201;
$\lfloor \cdot \rfloor$ the integer part.

The reference power $P_{ref}^g$ of the generator unit 201 is for example equal to the maximum power $P_{max}^g$ of the generator unit 201 or to the optimum power $P_{opt}^g$ of the generator unit 201.

Once the minimum number $N_{min}$ of generator units 201 has been calculated, a third step 103 of the method 100 consists in allocating the on state to the generator units 201 having a rank less than or equal to the minimum number $N_{min}$ of generator units 201 for all the time intervals Δt of the period T.

In the case where the period T is 24 hours and the time interval Δt 10 minutes, the number of time intervals Δt is equal to 144 and the third step 103 makes it possible to fix $2^{144 \times N_{min}}$ states of generator units 201. Thus, with reference to methods of the prior art, in the case of a network 200 comprising 14 generator units, it remains to determine $2^{2016} - 2^{144 \times N_{min}}$ states of generator units 201.

A fourth step 104 of the method 100 consists in completing the sequence of operation, that is to say allocating to each generator unit 201 of the set 202 to which no on or off state has been allocated in the sequence of operation, the on state or the off state for each time interval Δt of the sequence of operation and allocating an operating power $P_f$ to each generator unit 201 of the set 202 to which is allocated the on state at a given time interval Δt.

Since during the third step 103 of the method 100 the on state has been allocated for each time interval Δt of the sequence of operation to each generator unit 201 of the set 202 having a rank less than or equal to the minimum number $N_{min}$ of generator units 201, only the generator units 201 of the set 202 having a rank greater than the minimum number of generator units $N_{min}$ will be allocated an on or off state during the fourth step 104 of the method 100.

The fourth step 104 of the method 100 is carried out by optimisation of a cost function over the whole of the period T.

The optimisation of the cost function is carried out in an overall manner over the period T and not in an iterative manner by time interval Δt, that is to say that for a given generator unit 201, the fourth step 104 of the method 100 makes it possible to allocate simultaneously for the whole of the period T and for each time interval Δt, an on or off state and/or an operating power $P_f$ when the on state is allocated, for all the time intervals Δt of the sequence of operation.

The cost function comprises for example the sum, for each generator unit 201, of a start-up cost of the generator units 201 and an operating cost of the generator units 201 over the whole of the given period T.

The cost function may then be written as:

$$F = \sum_{\Delta t} F_f(\Delta t) + F_{on/off}(\Delta t)$$

With:
F the cost function;
$F_f$ an operating cost function;
$F_{on/off}$ a start-up cost function.

The operating cost of a generator unit 201 depends for example on the efficiency curve 400 of the generator unit 201.

The operating cost function is expressed for example as:

$$F_f(\Delta t) = \sum_{g,\Delta t} Fuel_g \times eff_g \times P_{f,g}(\Delta t)$$

With:
$Fuel_g$ the cost of fuel for the generator unit 201 of rank g;
$eff_g$ the efficiency of the generator unit 201 of rank g;
$P_{f,g}$ the operating power of the generator unit 201 of rank g.

The start-up cost of a generator unit 201 is expressed for example in operating hours. The start-up of a generator unit 201 corresponds for example to 5 operating hours and a replacement of parts is for example obligatory at the end of 1000 operating hours.

The cost function could also comprise a cost of storing energy in batteries which depends on the choice of the operating powers $P_f$ of the generator units 201.

An example of cost function is given in the publication "Tight and Compact MILP Formulation of Start-Up and Shut-Down Ramping in Unit Commitment", by Morales-Espana, German, Jesus M. Latorre, and Andres Ramos, *IEEE Transactions on Power Systems* 28, no 2 (May 2013): 1288-96.

The optimisation of the cost function may be formalised in the form of mixed linear programming and next resolved by a separation and evaluation procedure. This procedure is going to create a search tree which presents the space of all the possible solutions. Outside of the scope of the invention, the search tree would be exponential compared to the binary variables that are derived from the start-ups of the generator units 201, and thus the resolution time would be very long due to the number of variables. Within the scope of the invention however, the minimum number $N_{min}$ of generator units to which is assigned the on state over the whole of the sequence of operation makes it possible to reduce the search space. In addition, by performing the optimisation by increasing rank, the order of starting up the generator units 201 within a set 202 is defined, and it is thus possible to introduce an additional constraint in the formulation of the optimisation problem.

OnOf $f_g(\Delta t)$ is the binary variable which makes it possible to define the on or off state of a generator unit 201 at the time interval $\Delta t$. g is the rank of the generator unit 201 and belongs to the set [1,n], with n the number of generator units 201 of the set 202 and $\Delta t$ is in the set [1,t] with t the number of time intervals $\Delta t$ of the period T.

OnOf $f_g(\Delta t)=1$ when the on state is allocated to the generator unit 201 of rank g at the time interval $\Delta t$ and vice versa OnOf $f_g(\Delta t)=0$ when the off state is allocated to the generator unit of rank g at the time interval $\Delta t$.

This constraint may be written in the optimisation problem to determine the on or off states OnOf $f_g(\Delta t)$ and the operating powers $P_f(\Delta t)$ of the generator units 201 in the following form: the sum of the binary variables OnOf $f_g(\Delta t)$ over the time intervals $\Delta t$ of the sequence of operation for a generator unit 201 to which is allocated the rank g must be greater than or equal to the sum of the OnOf $f_{g+1}(\Delta t)$ over the time intervals $\Delta t$ of the sequence of operation for the generator unit 201 of order immediately greater g+1. This constraint is applied until g is equal to n-1 and may be written:

$$\sum_{\Delta t} OnOff_g(\Delta t) \geq \sum_{\Delta t} OnOff_{g+1}(\Delta t) \quad \forall g \in [1, n-1]$$

From a practical viewpoint, this signifies that a generator of rank g will be at least as on over the whole of the period T, as the generator of rank g+1, and thus a fortiori as any generator of rank posterior to rank g. The more a generator will be of low rank, the more said generator will be frequently on compared to a generator of posterior rank.

Alternatively, a stricter constraint may also be written in the following form: for each time interval $\Delta t$ of the sequence of operation, the binary variable OnOf $f_g(\Delta t)$ for a generator unit 201 to which is allocated the rank g must be greater than or equal to the binary variable OnOf $f_{g+1}(\Delta t)$ for the generator unit 201 of order immediately greater g+1. This stricter constraint speeds up the calculations while conserving the quality of the results obtained. This constraint is applied until g is equal to n-1 and may be written:

$$OnOff_g(\Delta t) \geq OnOff_{g+1}(\Delta t) \; \forall g \in [1, n-1]$$

Figure 5:
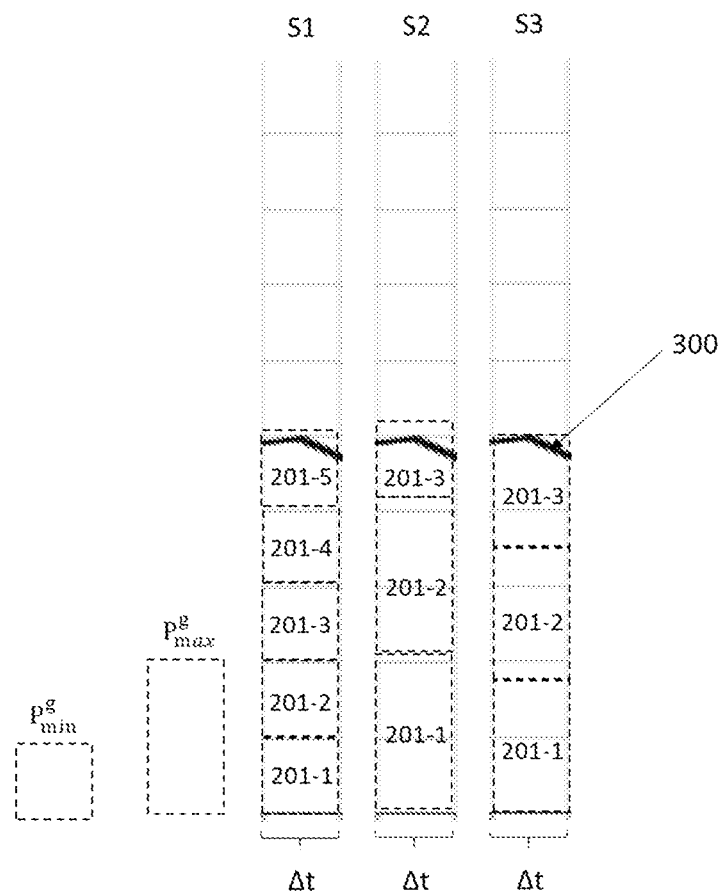
FIG. 5 illustrates several scenarios for the sequence of operation of the generator units of an electrical network for a given time interval.

FIG. 5 illustrates three scenarios for the sequence of operation of the generator units 201 by making the hypothesis that the period T comprises a single time interval $\Delta t$, the objective being to determine the on or off states and the operating powers $P_f$ of the generator units 201 to supply the power consumed over the time interval $\Delta t$ given by the load curve 300 while minimising the number of start-ups of the generator units 201 and by maximising the efficiency of each on generator unit 201, that is to say by minimising the cost function F described previously.

It is assumed that all the generator units 201 are identical and have for minimum power $P_{min}{}^g$ and for maximum power $P_{max}{}^g$ such as represented in FIG. 5.

In the scenario S1, the generator units 201 with an operating power $P_f$ equal to the minimum power $P_{min}{}^g$ of generator unit 201 are used to the maximum.

To reach the load curve 300 in such conditions, five generator units 201-1, 201-2, 201-3, 201-4, 201-5 at the minimum power $P_{min}{}^g$ are necessary.

In the scenario S2, the generator units 201 with an operating power $P_f$ equal to the maximum power $P_{max}{}^g$ of generator unit 201 are used to the maximum.

To reach the load curve 300 in such conditions, two generator units 201-1, 201-2 are needed at the maximum power $P_{max}{}^g$ and one generator unit 201-3 at the minimum power $P_{min}{}^g$.

In the scenario S3, generator units 201 with an optimum operating power $P_f$ maximising the efficiency of the generator units 201 are used to the maximum, for example around 85% of the maximum power $P_{max}{}^g$.

To reach the load curve 300 in such conditions, two generator units 201-1, 201-2 are needed at the optimum power and one generator unit 201-3 with an operating power equal to around 75% of the maximum power $P_{max}{}^g$.

If the scenarios S1, S2 and S3 are compared, in the hypothesis of an efficiency curve similar to FIG. 5:
  the start-up cost of the generator units 201 is higher in the scenario S1 than in the scenarios S2 and S3 since two generator units 201 are started up at least in the scenarios S2 and S3;

the operating cost of the generator units 201 is higher in the scenario S1 than in the scenario S2 since the efficiency at the maximum power $P_{max}^g$ is better than the efficiency at the minimum power $P_{min}^g$ and the operating cost of the generator units 201 is higher in the scenario S2 than in the scenario S3 since the efficiency at the optimum power or at 75% of the maximum power $P_{max}^g$ is better than the efficiency at the maximum power $P_{max}^g$.

Thus, among the three scenarios S1, S2 and S3, the scenario S3 is that which minimises the cost function.

In the case where the network 200 comprises several sets 202, the method 100 comprises for example a prior step consisting in scheduling the sets 202 such that, the more the generator units 201 of a set 202 operate with high powers, the lower the order of the set 202.

For example, if the example of FIG. 2 is taken, the set 202-1 comprising the generator units 201 operating with powers greater than the generator units 201 of the set 202-2 and the set 202-2 comprising the generator units 201 operating with powers greater than the generator units 201 of the set 202-3, the order 1 is allocated to the set 202-1, the order 2 is allocated to the set 202-2 and the order 3 is allocated to the set 202-3.

Once the sets 202 of the electrical network 200 are scheduled, the steps 101 to 104 of the method 100 are carried out by increasing order for each set 202 of the electrical network 200 in such a way that the projected load curve used for the set 202 of order r takes into account the energy supplied by the generator units 201 of the sets 202 having an order less than r.

In the example of FIG. 2, the method 100 is then carried out firstly for the set 202-1, then for the set 202-2, then for the set 202-3.

For the set 202-1, the projected load curve only takes into account the energy consumed on the electrical network and optionally the energy supplied by energy sources other than the generator units 201. At the end of the method 100 for the set 202-1, the sequence of operation for the set 202-1 is known and the energy that will be produced by the generator units 201 of the set 202-1 is thus known. For the set 202-2, the projected load curve also takes into account the energy that will be produced by the generator units 201 of the set 202-1. For the set 202-3, the projected load curve takes into account the energy that will be produced by the generator units 201 of the set 202-1 and the energy that will be produced by the generator units 201 of the set 202-2.

In the case where the period T is 24 hours and the time interval Δt 10 minutes:
- when the network 200 comprises 13 generator units 201, the method 100 determines by mixed linear programming integrating the formulation of the problem according to the invention the sequence of operation in less than 10 seconds, whereas the approach by mixed linear programming of the prior art does not manage to find a solution;
- when the network 200 comprises 6 generator units 201, the method 100 determines by mixed linear programming integrating the formulation of the problem according to the invention the sequence of operation in less than 5 seconds and the approach by mixed linear programming of the prior art in 56 seconds;
- when the network 200 comprises 4 generator units 201, the method 100 and the approach by mixed linear programming of the prior art determine the sequence of operation in less than 5 seconds.

Thus, the method 100 according to the first aspect of the invention makes it possible to determine a sequence of operation for a network 200 comprising more than ten or so generator units 201, more rapidly or as rapidly as the approach of the prior art.

The method 100 is implemented by a computer comprising a processor and a non-transitory memory encoded with machine executable instructions for carrying out the method.

A second aspect of the invention relates to a method for implementing, on the electrical network 200, the sequence of operation determined by the method 100 according to the first aspect of the invention during the period T.

Figure 6:
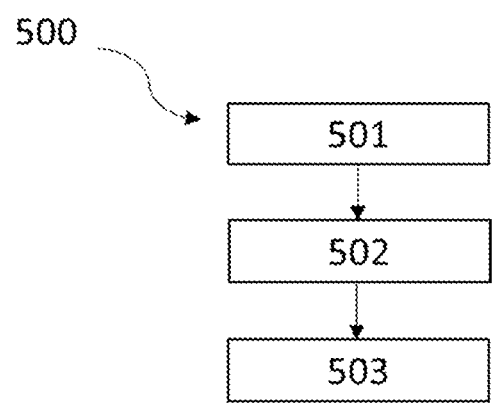
FIG. 6 is a synoptic diagram representing the steps of the method according to the second aspect of the invention.

FIG. 6 is a synoptic diagram representing the steps of the method 500 according to the second aspect of the invention.

The steps of the method 500 are carried out for each time interval Δt of the period T.

A first step 501 consists in starting up each off generator unit 201 to which is allocated the on state in the sequence of operation at the time interval Δt, that is to say starting up each generator unit 201 to which is assigned the on state in the sequence of operation at the time interval Δt and the off state in the sequence of operation at the time interval Δt preceding the time interval Δt.

A second step 502 consists in shutting down each on generator unit 201 to which is allocated the off state in the sequence of operation at the time interval Δt if the generator unit 201 is on, that is to say shutting down each generator unit 201 to which is assigned the off state in the sequence of operation at the time interval Δt and the on state in the sequence of operation at the time interval Δt preceding the time interval Δt.

A third step 503 consists in placing at the determined operating power $P_f$ each generator unit 201 to which is allocated the on state in the sequence of operation at the time interval Δt.

The steps of the method 501 and 502 may be carried out in any order.

It will be appreciated that the method and system described herein provide a technical solution to the technical problem currently faced by the skilled artisan for managing and planning the operation of generator units of an electrical network efficiently. As explained previously, current management and planning methods and systems have the major drawback of only working for electrical micro-networks having only several generator units and do not provide management and planning of operation for an electrical network having more than 4 generator units with a 2.3 GHz processor and 8G of RAM.

An aspect of the method described herein is specifically tied to the practical application of managing and planning the operation of generator units of an electrical network efficiently on a given period divided into several time intervals. The method recited in the claims provide the technical features and steps that permit one to determine the sequence of operations for managing and planning the operation of generator units of an electrical network and solve the technical problem identified above since the method recited in the claims enables a sequence of operation for electrical networks having fifteen or so generator units for a time interval of 1 minute over a period of 24 h, for electrical networks having more than one hundred or so generator units for a time interval of 10 minutes over a period of 24 h and for electrical networks having more than 300 generator units for a time interval of 30 minutes over a period of 24 h to be obtained. The determined sequence of operations can then be implemented on the considered electrical network on the considered period by switching on or off the generator units at each time interval according to the determined sequence of operations. The operation of the generator units of the electrical network thus minimizes fuel consumption, wear of the pool of generator units and greenhouse gas emissions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium (e.g. a memory) is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "programmed processor" encompasses all kinds of apparatus, devices, and machines for processing data, including by way of example a programmable processor, digital signal processor (DSP), a computer, a system on a chip, or multiple ones, or combinations, of the foregoing. The apparatus can include special purpose logic circuitry, e.g., an FPGA (field programmable gate array) or an ASIC (application-specific integrated circuit).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention has been described and illustrated in the present detailed description and in the figures of the appended drawings, in possible embodiments. The present invention is not however limited to the embodiments described. Other alternatives and embodiments may be deduced and implemented by those skilled in the art on reading the present description and the appended drawings.

In the claims, the term "includes" or "comprises" does not exclude other elements or other steps. A single processor or several other units may be used to implement the invention. The different characteristics described and/or claimed may be beneficially combined. Their presence in the description or in the different dependent claims do not exclude this possibility. The reference signs cannot be understood as limiting the scope of the invention.

The invention claimed is:

1. A method implemented by computer, for determining a sequence of operation of at least one set of generator units of an electrical network, the generator units of the set being identical, the sequence of operation allocating for each time interval of a given period, an off state or an on state to each generator unit and an operating power comprised between a minimum power of the generator unit and a maximum power of the generator unit to each generator unit to which is allocated the on state for the time interval, the method comprising:
  assigning a rank to each generator unit;
  from a projected load curve, determining a minimum number of generator units $N_{min}$ destined to be allocated the on state over the period;
  for each generator unit having a rank less than or equal to the minimum number of generator units $N_{min}$, allocating in the sequence of operation the on state to the generator unit for each time interval;
  for each generator unit having a rank greater than the minimum number of generator units $N_{min}$, allocating, by increasing rank, for each time interval of the sequence of operation the on state or the off state to the generator unit, and for each generator unit to which is assigned the on state at a given time interval of the sequence of operation, allocating an operating power, by optimisation of a cost function over the period with:
    a constraint according to which the number of time intervals over the whole of the period for which the on state is allocated to the generator unit is greater than or equal to the number of time intervals over the whole of the period for which the on state is allocated to each generator unit having a rank greater than the generator unit; or a constraint according to which, for each time interval of the period, the on state can only be allocated to a generator unit if the on state has been allocated to each generator unit having a rank less than the generator unit;

the minimum number $N_{min}$ of generator units being chosen such that:

$$\left\lfloor \frac{P^c_{min}}{P^g_{max}} \right\rfloor + 1 \leq N_{min} \leq \left\lfloor \frac{P^c_{max}}{P^g_{min}} \right\rfloor$$

With: $P^c_{min}$ the minimum power of the projected load curve, $P^c_{max}$ the maximum power of the projected load curve, $P^g_{min}$ the minimum power of the generator unit, $P^g_{max}$ the maximum power of the generator unit and $\lfloor \cdot \rfloor$ the integer part.

2. The method according to claim 1, wherein the rank of a generator unit depends on its number of operating hours and/or on its availability.

3. The method according to claim 1, wherein the minimum number $N_{min}$ of generator units is equal to:

$$N_{min} = \left\lfloor \frac{\alpha . P^c_{min} + \beta . P^c_{av}}{P^g_{ref}} \right\rfloor$$

With: $P^c_{min}$ the minimum power of the projected load curve, $P^c_{av}$ the average power of the projected load curve, $P^g_{ref}$ a reference power of the generator unit, $\alpha$ and $\beta$ coefficients comprised between 0 and 1, notably such that the sum of $\alpha$ and $\beta$ is equal to 1 and $\lfloor \cdot \rfloor$ the integer part.

4. The method according to claim 1, wherein the minimum number $N_{min}$ of generator units is equal to:

$$N_{min} = \left\lfloor \frac{P^c_{min}}{P^g_{ref}} + 1 \right\rfloor$$

With: $P^c_{min}$ the minimum power of the projected load curve, $P^g_{ref}$ a reference power of the generator unit and $\lfloor \cdot \rfloor$ the integer part.

5. The method according to claim 3, wherein the reference power $P^g_{ref}$ of the generator unit is equal to the maximum power $P^g_{max}$ of the generator unit or to an optimum power $P^g_{opt}$ of the generator unit.

6. The method according to claim 1, wherein the cost function comprises the sum, for each generator unit, of a start-up cost of the generator units and an operating cost of the generator units over the period.

7. The method according to claim 5, wherein the cost function comprises the sum, for each generator unit, of a start-up cost of the generator units and an operating cost of the generator units over the period and wherein the operating cost of a generator unit depends on an efficiency curve of the generator unit giving the efficiency of the generator unit as a function of its operating power, the optimum power $P^g_{opt}$ of the generator unit corresponding to the maximum of the efficiency curve.

8. The method according to claim 1, wherein the electrical network comprises several sets of identical generator units, the method comprising a prior step of scheduling the sets of generator units by decreasing maximum power of the generator units of the set, the steps of the method being carried out for each set by increasing order, the projected load curve for the set taking into account the energy consumption on the electrical network and the energy supplied by each set having an order less than the set.

9. The method according to claim 8, wherein the projected load curve further takes into account the energy produced by energy sources other than the generator units in the electrical network.

10. The method according to claim 9, wherein the other energy sources are at least one photovoltaic device and/or at least one wind powered device and/or at least one battery.

11. A method for implementing, on the electrical network, the sequence of operation determined by the method according to claim 1 during the period, comprising:
at each time interval:
starting up each off generator unit to which is allocated the on state in the sequence of operation at the time interval;
shutting down each on generator unit to which is allocated the off state in the sequence of operation at the time interval if the generator unit is on;
placing at the corresponding operating power, each generator unit to which is allocated the on state in the sequence of operation at the time interval.

12. A non-transitory computer readable medium comprising instructions which, when executed by a computer, implement the steps of the method according to claim 1.

* * * * *